April 22, 1930.  C. A. ROWLEY  1,755,365
CUTTING APPARATUS FOR SHEET GLASS
Original Filed May 19, 1924
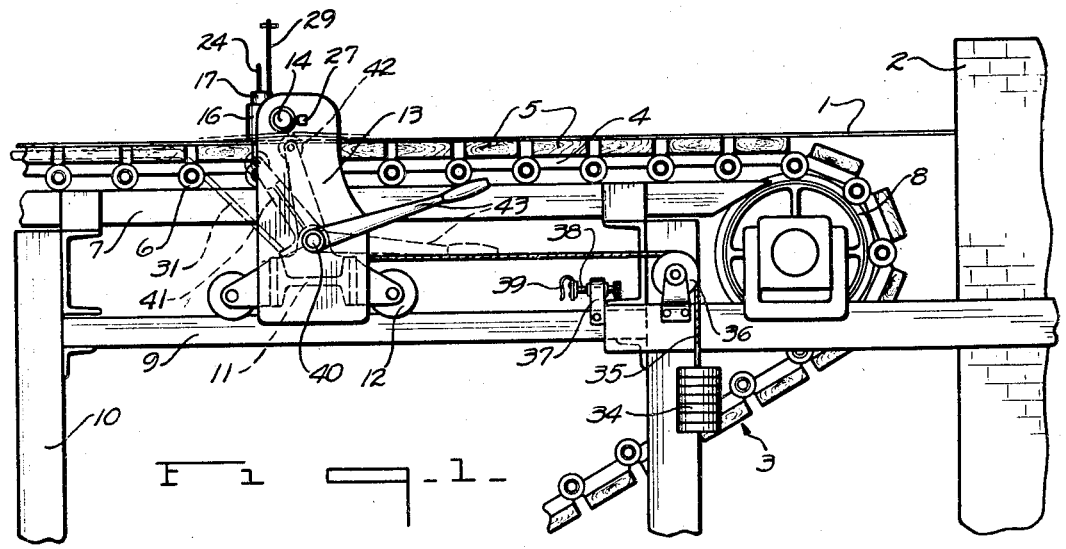
Fig. 1.
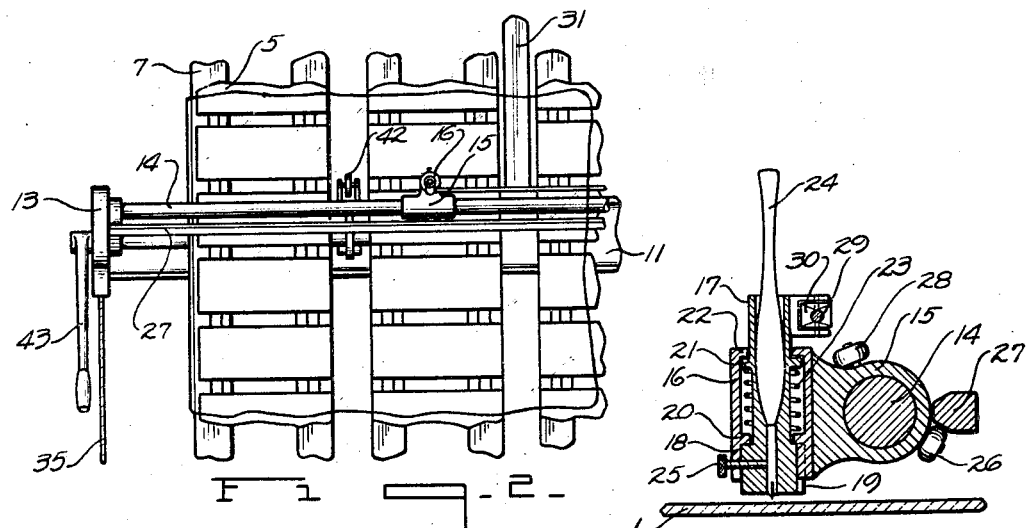
Fig. 2.
Fig. 3.
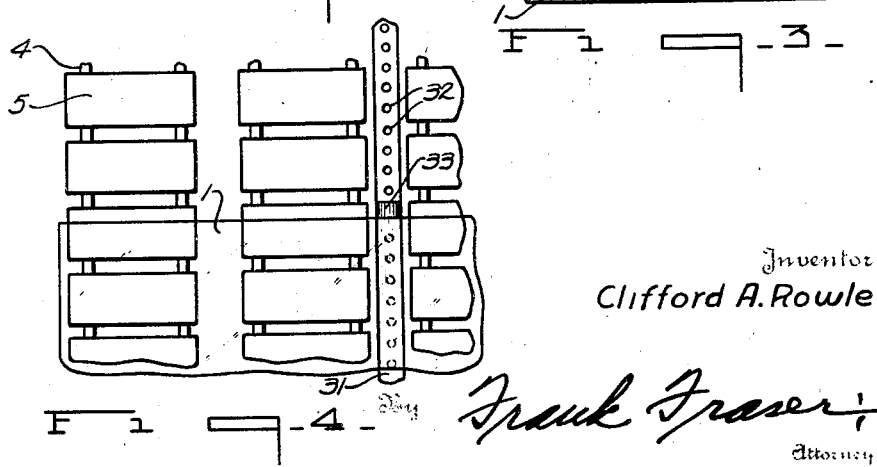
Fig. 4.
Inventor
Clifford A. Rowley
Frank Fraser
Attorney Patented Apr. 22, 1930

1,755,365

UNITED STATES PATENT OFFICE

CLIFFORD A. ROWLEY, OF CHICAGO, ILLINOIS, ASSIGNOR TO LIBBEY-OWENS GLASS COMPANY, OF TOLEDO, OHIO, A CORPORATION OF OHIO

CUTTING APPARATUS FOR SHEET GLASS

Original application filed May 19, 1924, Serial No. 714,417. Divided and this application filed April 1, 1929. Serial No. 351,499.

This invention relates to an apparatus for cutting or scoring transversely, at intervals, a continuously drawn sheet of glass and the present application is a division of my co-pending application entitled "Cutting and measuring apparatus for sheet glass" filed May 19, 1924, now Patent No. 1,710,898 granted April 30, 1929.

In certain systems of producing sheet glass, a continuous flat sheet of glass is drawn from a molten source, and passed through a horizontal leer. The continuous sheet of glass emerges from the leer onto a moving table or conveyor, known as the "cutting table", and while on this table, sections are carried away to the cutting room where they are divided into the desired sizes. This cutting of sheets or sections from the continuously advancing ribbon of glass is usually performed with a hand operated cutting tool which is drawn across the sheet at intervals. These score lines are seldom accurately straight or perpendicular to the line of travel of the sheet. The distance between score lines is also only roughly measured, so that there is considerable waste at the ends where the sheets are afterwards accurately cut down to the desired sheet sizes.

The object of the present invention is to provide an apparatus for accurately scoring the sheet along straight transverse lines perpendicular to the travel of the sheet. Means are also provided to measure the length of the sheet sections accurately, that is measure accurately the distance of the score line from the advancing end of the ribbon where the last preceding cut was made. In this way, the sheet sections will be cut with accurate parallel end edges, a fixed distance apart, so that there will be no necessary waste at these ends of the sheet sections during the subsequent cutting process.

Other objects and advantages of the invention will become more apparent during the course of the following description when taken in connection with the accompanying drawings.

In the drawings forming a part of this application and wherein like numerals are employed to designate like parts throughout the same.

Fig. 1 is a side elevation of the present invention applied to the end of a sheet glass machine.

Fig. 2 is a fragmentary plan view thereof.

Fig. 3 is a vertical section through the carrier for the scoring tool, and

Fig. 4 is a plan view of the measuring means.

Referring to the drawings, the flat continuous sheet of glass 1 emerges from the end of leer 2, onto the moving supporting table or conveyor 3 which moves at the same speed as the sheet of glass. This table 3 may take a variety of forms, but is here shown as comprising a series of parallel endless chains 4 carrying a series of wooden blocks 5, which form in the upper run of the chains a flat even supporting table for the glass sheet. Each chain has a series of rollers 6 which, in their upper run, travel on the supporting tracks 7. The chains are carried at their ends on rollers or sprockets 8, one or both of which may be driven by any suitable means to move the table in the same direction and at the same speed as the sheet 1.

It has been customary in former practice, to divide the endless sheet or ribbon 1 into sections of the desired size, by manually drawing a score tool, at intervals, across the moving sheet. Since the sheet is in motion, it is particularly difficult to make an accurate straight cut exactly at right angles to the line of travel of the sheet. It is also difficult to accurately measure off the desired length of sheet between the successive score lines. After the sheet is scored it is broken along the scored line by inserting the hand or a tool beneath the edge of the sheet, and elevating the sheet until it cracks along the scored line.

The present invention is designed to more accurately and simply perform the above operations, thus saving both labor and glass. Mounted at each side of and beneath the conveyor table are short rails 9 mounted at their ends on the supporting structure 10 for the cutting table. The rails 9 at either side of the table extend parallel to each other and to the direction of travel of the sheet and cutting table. They need not be very long as the total travel of the cutter-carriage which moves thereon will be only a few inches. A carriage 11 extending transversely beneath the cutting table and glass sheet has rollers 12 which are supported on and guided by the rails 9. At either end of the carriage 11, a wall 13 extends upwardly above the cutting table 3 and glass sheet 1, and these walls are joined by a transverse guide bar 14. This bar 14, in any position of the carriage 11, extends above the glass sheet 1 accurately at right angles to the direction of travel of the sheet.

The cutting or scoring tool is adapted to be guided back and forth along the bar 14. This scoring tool and the means for carrying the same is shown more particularly in Fig. 3. As here shown, the guide bar 14 is circular in cross section and the tool carrier or carriage 15 has a slidable and rotatable fit on this guide bar. The carrier 15 at one side is provided with a cylindrical housing 16 for the tool holder 17. This tool holder is adapted to have a limited vertical sliding movement through the housing 16, the lower portion of the holder snugly fitting a cylindrical recess 18 in the lower portion of the housing and being keyed thereto as at 19 to prevent relative rotation of the two members. Upward movement of holder 17 through the housing is limited by the engagement of the lower portion of holder 17 with the inwardly extending flange 20 of housing 16, and by the engagement of the outwardly extending flange 21 on the holder with the inwardly extending flange 22 at the upper end of the housing 16. A compression spring 23 confined by the flanges 20 and 21 serves to normally hold the tool holder and the tool at the upper limit of their movement. The cutting tool 24 is here shown as of the ordinary steel-wheel type (although a diamond might be used) and this tool is removably secured in the holder by set-screw 25.

While the tool carrier 15 is rotatable about the guide bar 14, its rotation in one direction is limited by the engagement of roller 26 pivoted on the carrier housing 15 with a stationary guide or stop bar 27 also carried by the walls 13 of the carriage 11 and positioned parallel to and at the rear of guide bar 14. The relative locations of roller 26, stop bar 27 and housing 16 are such that when the roller 26 is in engagement with bar 27, scoring tool 24 will extend perpendicular to the surface of glass sheet 1 therebeneath. A second roller 28 is carried by carrier 15 at such a position that the carrier may be swung around clockwise as viewed in Fig. 3 until this roller engages with the upper side of bar 27. In this position, the carrier and cutting tool will be supported entirely away from the sheet 1 to allow greater freedom of movement in handling the glass sheet. A handle 29 of sufficient length to be easily grasped by the operator standing at the side of the machine, is secured through universal joint 30 to one side of the upper end of tool holder 17.

When operating the scoring tool, the operator grasps the outer end of rod 29 and pushes the carrier 15 backward and forward along the guide bar 14. Whenever it is desired to make a score line on the glass sheet, a downward pressure is exerted on the handle 29 which will lower the tool against the action of spring 23 onto the surface of the glass sheet. Whenever this downward pressure on the handle 29 is removed the spring 23 will elevate the cutting tool away from the sheet surface. When not in use, it is preferable to throw the carrier 15 and cutting tool over to the right until the roller 28 engages with the upper side of bar 27. When in this position, there is no possibility of the glass sheet coming into contact with the cutting wheel even though the sheet might be elevated somewhat above the surface of the conveying table.

It is obvious that since the glass sheet 1 and table 3 are continuously moving it is necessary that the carriage 11 and cutter guide 14 move with the table and sheet while the scoring operation is being performed. The present invention embodies means whereby the carriage and guide bar will be caused to move with the sheet during the scoring operation whereby each score line will be exactly at right angles to the direction of travel of the sheet and parallel with the preceding score line.

To effect this movement of the cutter guide with the sheet, there is provided a measuring bar or stick 31 connected at its inner end to the carriage 11 and supported beneath the path of travel of glass sheet 1 in one of the spaces between adjacent rows of supporting blocks 5. The measuring bar 31 is preferably provided with a series of openings 32 adapted to receive therein a block or the like 33, said openings being spaced from one another a suitable distance. For example, the openings may be spaced one inch apart.

According to the present invention, the cutting tool is normally held in an inoperative position as shown in Fig. 3. After it has been determined what length of sheet is to be cut, the block 33 is inserted in the proper opening 32 in measuring bar 31. Since this block is disposed in the path of travel of the sheet, the advancing free end of said sheet engaging the block will cause the carriage 11 and cutter guide 14 to be moved therewith. During the movement of the carriage with the sheet, the cutting tool is drawn across the sheet to score the same. After the sheet has been transversely scored, the block 33 is removed from the measuring bar to permit the carriage to return to its starting position. This return movement of the carriage may be effected by the provision of weights 34 suspended from one end of cables 35 which pass up over guide pulleys 36, the other ends of the cables being fastened to portions of carriage 11. Mounted in suitable brackets 37 (Fig. 1) secured to the rails 9 are stop screws 38 carrying the buffer springs 39 adapted to engage with a portion of carriage 11. Thus, when the carriage is released after the scoring operation, the weights 34 will draw the carriage back to its normal stationary position against the stops 39.

Mounted on a cross shaft 40 extending transversely through carriage 11 beneath the sheet 1 and conveyor 3, is a series of upwardly extending crank arms 41, each carrying at its upper end a roller 42. An operating handle 43 is secured to the outer end of shaft 40 in position to be readily grasped by the operator. After the score has been made across the glass sheet, the operator will grasp the handle 43 and depress the same, thus simultaneously lifting all of the rollers 42 against the lower surface of the sheet between the several rows of blocks 5 and elevating the sheet adjacent the scored line until it breaks along this line.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for transversely scoring a moving sheet of glass, comprising a carriage movable parallel with the movement of the sheet and including a guide bar extending transversely above said sheet, and a cutter carrier having a slidable and rotatable fit on said guide bar.

2. An apparatus for transversely scoring a moving sheet of glass, comprising a carriage movable parallel with the movement of the sheet and including a guide bar extending transversely above said sheet, and a cutter carrier slidably mounted upon the guide bar and also movable through a vertical arc about an axis extending transversely of the direction of travel of said sheet.

3. An apparatus for transversely scoring a moving sheet of glass, comprising a carriage movable parallel with the movement of the sheet and including a guide bar extending transversely above said sheet, a cutter carrier having a slidable and rotatable fit on said guide bar, and means for limiting the rotative movement of the cutter carrier with respect to the guide bar.

4. An apparatus for transversely scoring a moving sheet of glass, comprising a carriage movable parallel with the movement of the sheet, and including a guide bar extending transversely above said sheet, a cutter carrier slidably mounted upon the guide bar and also movable through a vertical arc about an axis extending transversely of the direction of travel of said sheet, and stop members for limiting the rotative movement of the cutter carrier with respect to the guide bar.

5. An apparatus for transversely scoring a moving sheet of glass, comprising a carriage movable parallel with the movement of the sheet and including a guide bar extending transversely above said sheet, a cutter carrier having a slidable and rotatable fit on said guide bar, a stop bar also carried by the carriage and extending substantially parallel to the guide bar, and stop members carried by the cutter carrier and adapted to engage the stop bar to limit rotative movement of said carrier with respect to said guide bar.

6. An apparatus for transversely scoring a moving sheet of glass, comprising a carriage movable parallel with the movement of the sheet and including a guide bar extending transversely above said sheet, a cutter carrier having a slidable and rotatable fit on said guide bar, said carrier being provided with a housing, a tool holder mounted within the housing for vertical sliding movement with respect thereto, and a cutting tool carried by and movable with said holder.

7. An apparatus for transversely scoring a moving sheet of glass, comprising a carriage movable parallel with the movement of the sheet and including a guide bar extending transversely above said sheet, a cutter carrier having a slidable and rotatable fit on said guide bar, said carrier being provided with a housing, a tool holder mounted within the housing for vertical sliding movement with respect thereto, a cutting tool carried by and movable with said holder, spring means within the housing for normally urging the holder and tool upwardly away from the glass, and an operating handle carried by said holder and by means of which the holder may be lowered to move the tool into engagement with the glass.

8. An apparatus for transversely scoring a moving sheet of glass, comprising a carriage movable parallel with the movement of the sheet and including a guide bar extending transversely above said sheet, a cutter carrier slidably mounted upon the guide bar and also movable through a vertical arc about an axis extending transversely of the direction of travel of said sheet, and means for moving the cutter carrier through said vertical arc and for also moving it over the sheet when said carriage is moving with said sheet.

9. An apparatus for transversely scoring a moving sheet of glass, comprising a carriage movable parallel with the movement of the sheet and including a guide bar extending transversely above said sheet, a cutter carrier slidably mounted upon the guide bar, and a cutter carried by said carrier and movable through a vertical arc about an axis extending transversely of the direction of travel of said sheet.

10. An apparatus for transversely scoring a moving sheet of glass, comprising a carriage movable parallel with the movement of the sheet and including a guide bar extending transversely above said sheet, a cutter carrier slidably mounted upon the guide bar, a cutter holder carried by said carrier, and a cutting tool carried by said holder and movable therewith through a vertical arc about an axis extending transversely of the direction of travel of said sheet.

Signed at Chicago, in the county of Cook and State of Illinois, this 28th day of March, 1929.

CLIFFORD A. ROWLEY.